Dec. 12, 1933.  J. SNEED  1,939,577
MACHINE FOR FORMING RIM MEMBERS
Filed Aug. 3, 1931  9 Sheets-Sheet 1
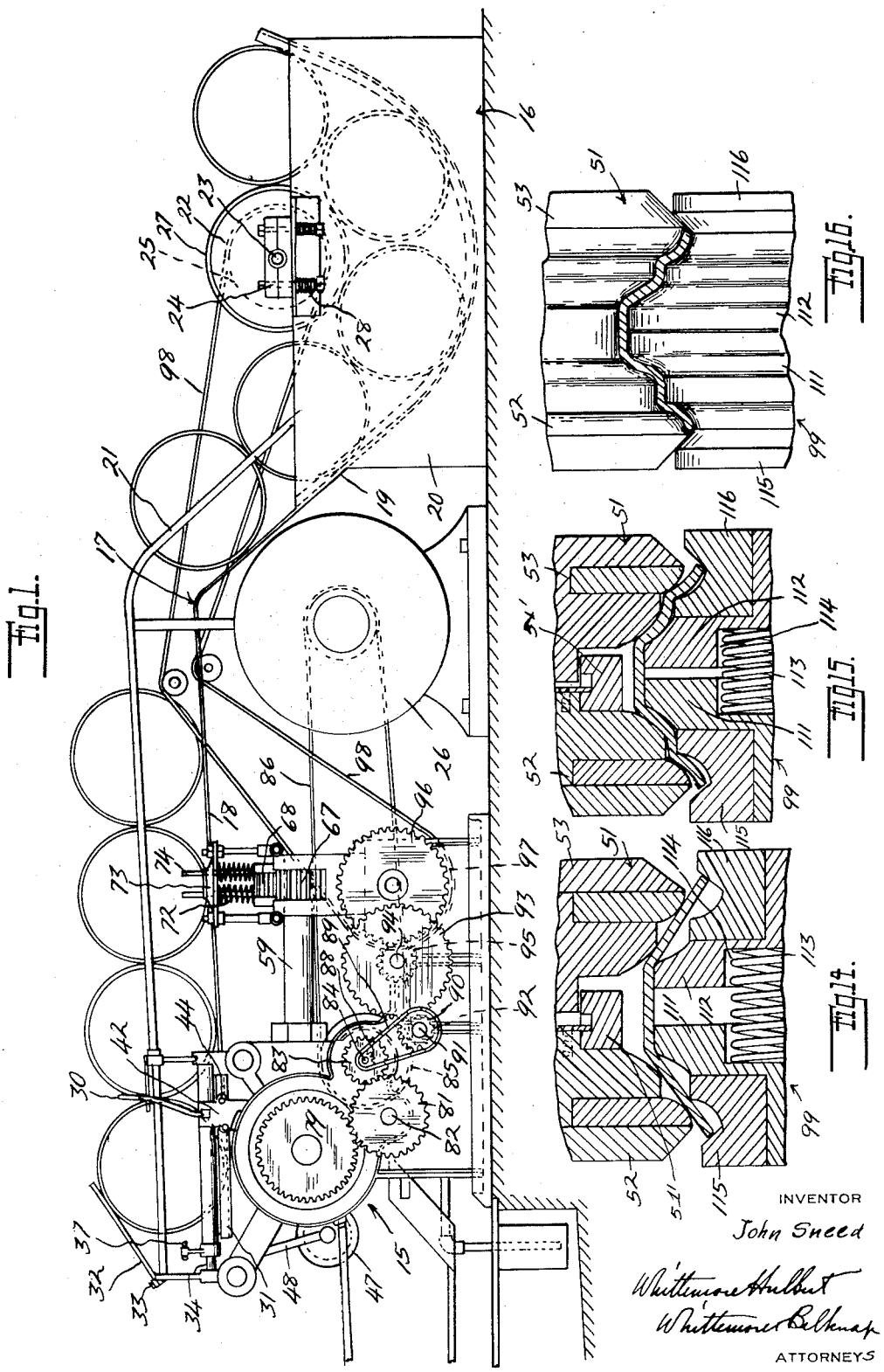
INVENTOR
John Sneed
ATTORNEYS

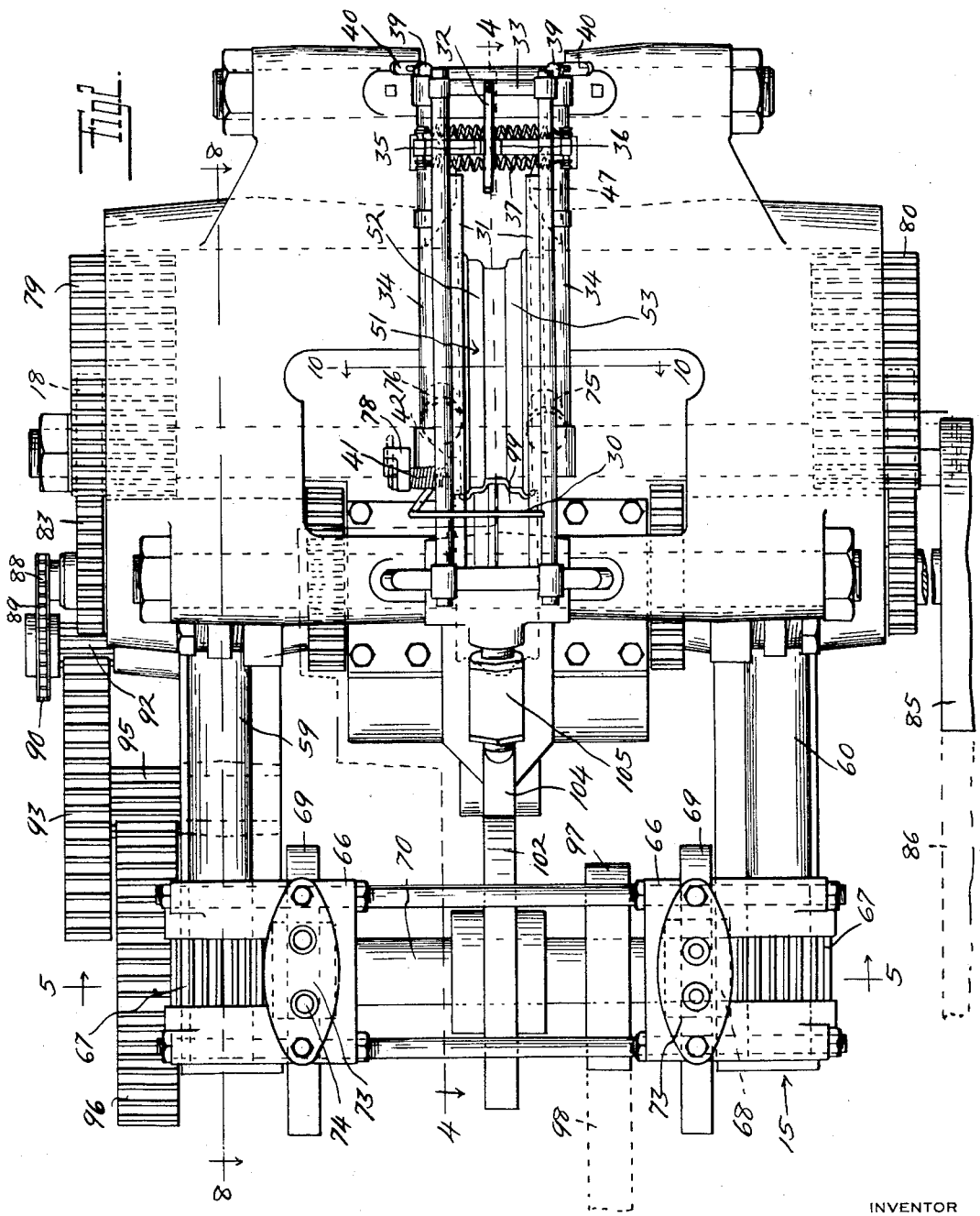

Dec. 12, 1933.    J. SNEED    1,939,577
MACHINE FOR FORMING RIM MEMBERS
Filed Aug. 3, 1931    9 Sheets-Sheet 3
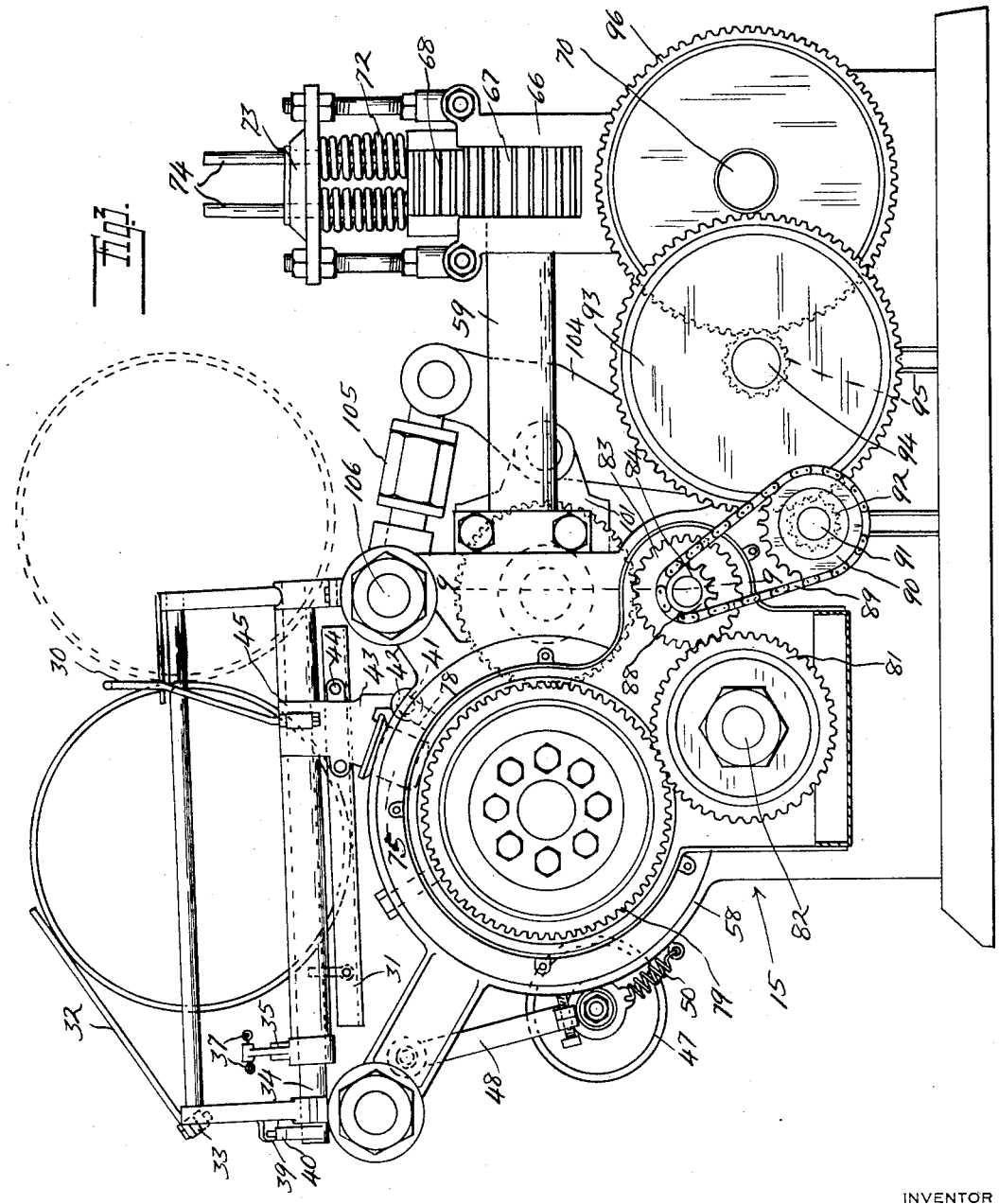
INVENTOR
John Sneed
BY
Whittemore Hulbert Whittemore Belknap
ATTORNEYS Dec. 12, 1933.  J. SNEED  1,939,577
MACHINE FOR FORMING RIM MEMBERS
Filed Aug. 3, 1931  9 Sheets-Sheet 4
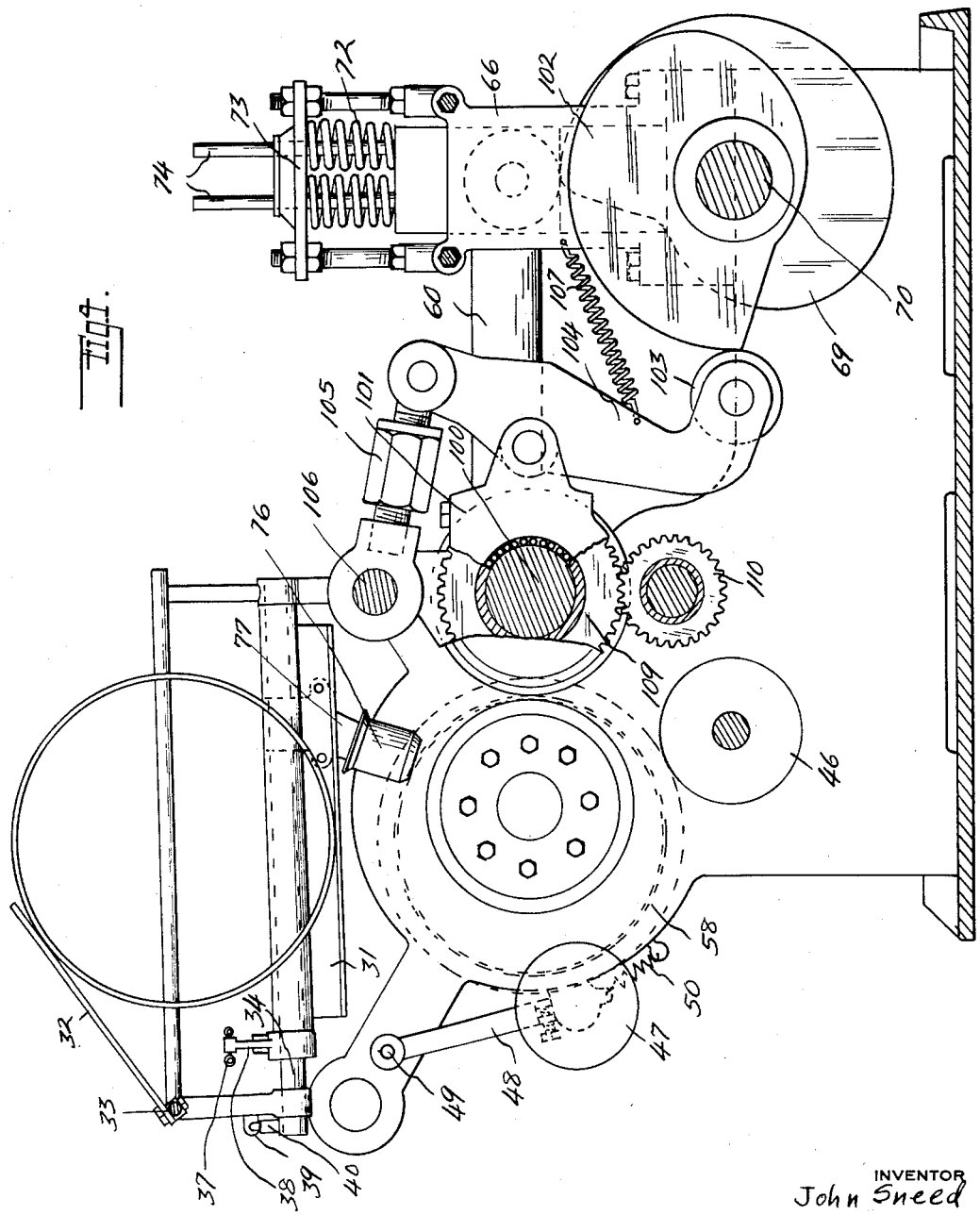
INVENTOR
John Sneed
BY
ATTORNEYS Dec. 12, 1933.  J. SNEED  1,939,577
MACHINE FOR FORMING RIM MEMBERS
Filed Aug. 3, 1931  9 Sheets-Sheet 5
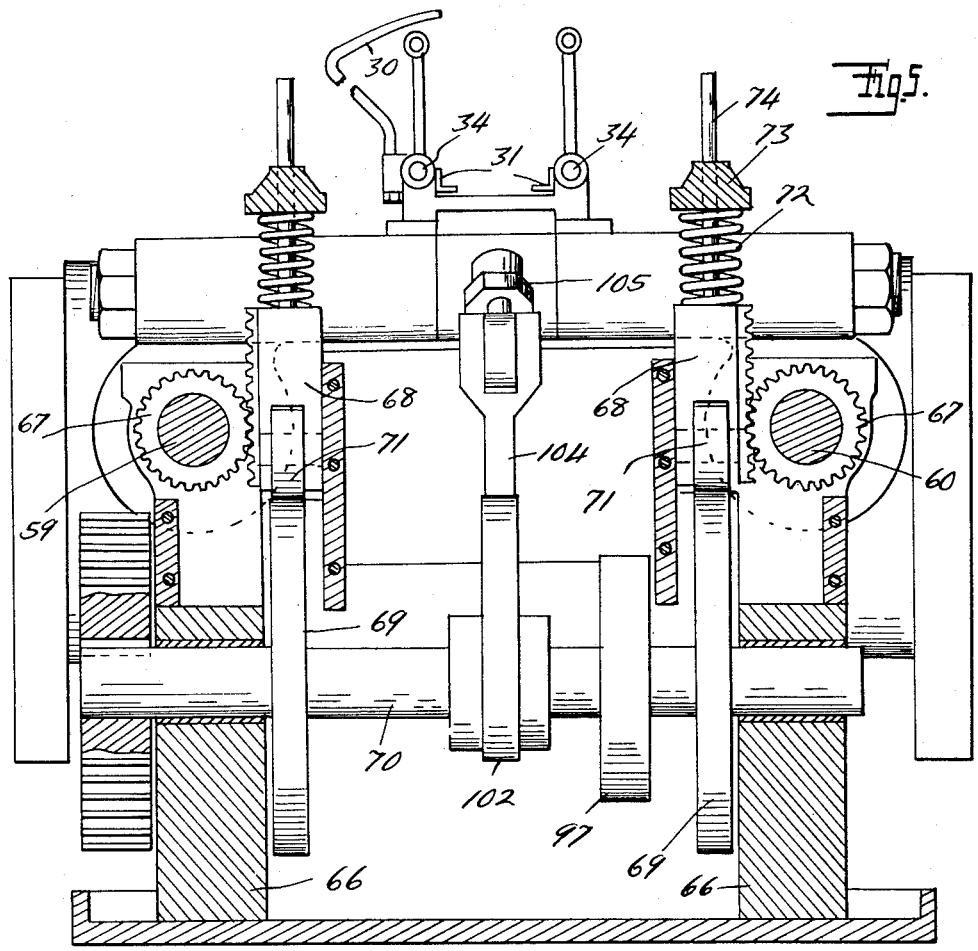
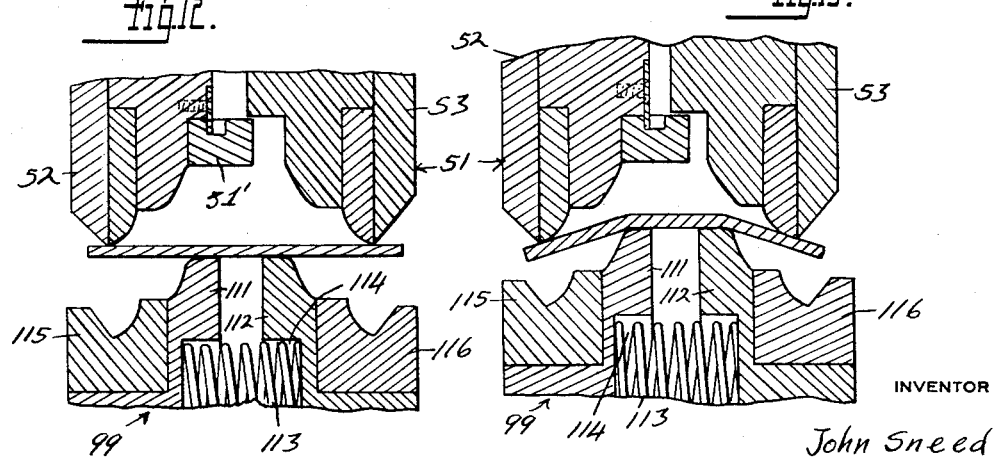
INVENTOR
John Sneed

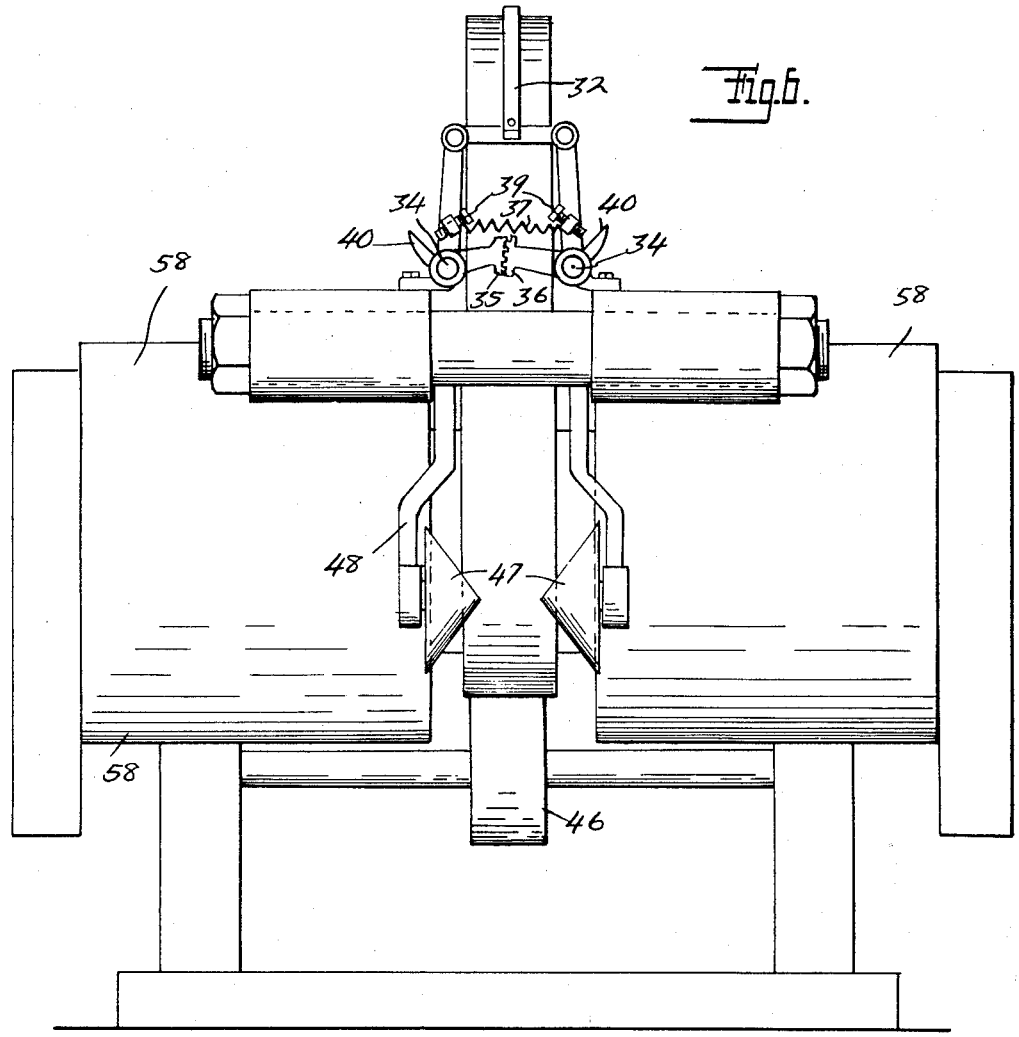

Dec. 12, 1933.    J. SNEED    1,939,577
MACHINE FOR FORMING RIM MEMBERS
Filed Aug. 3, 1931    9 Sheets-Sheet 8
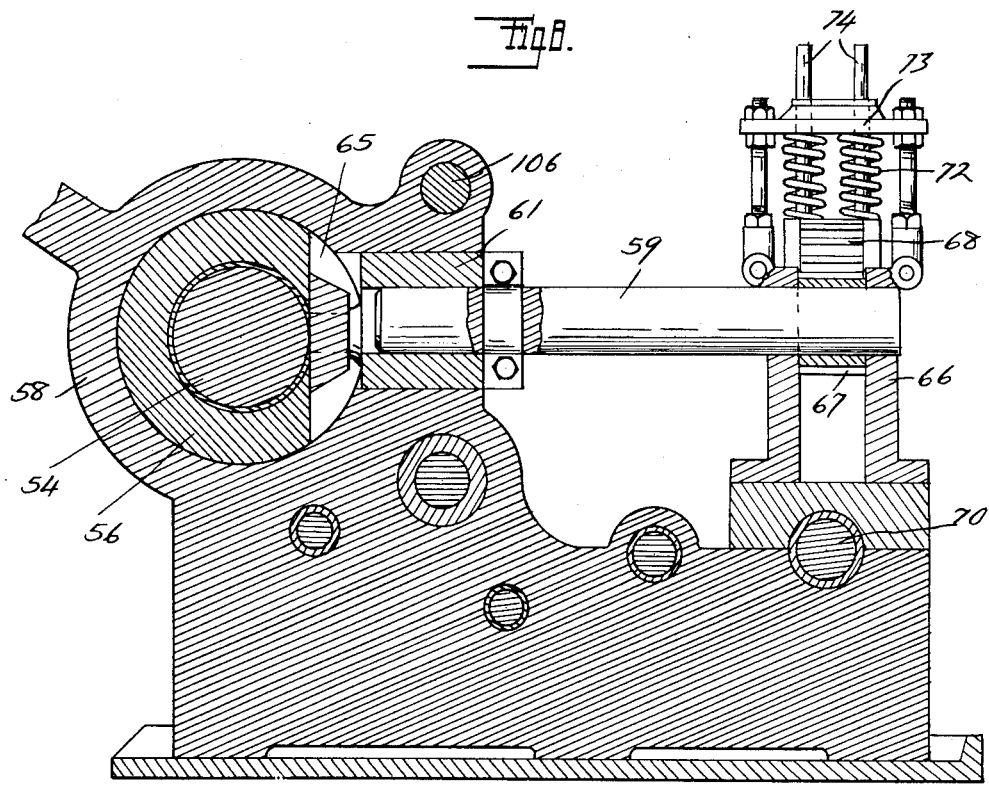
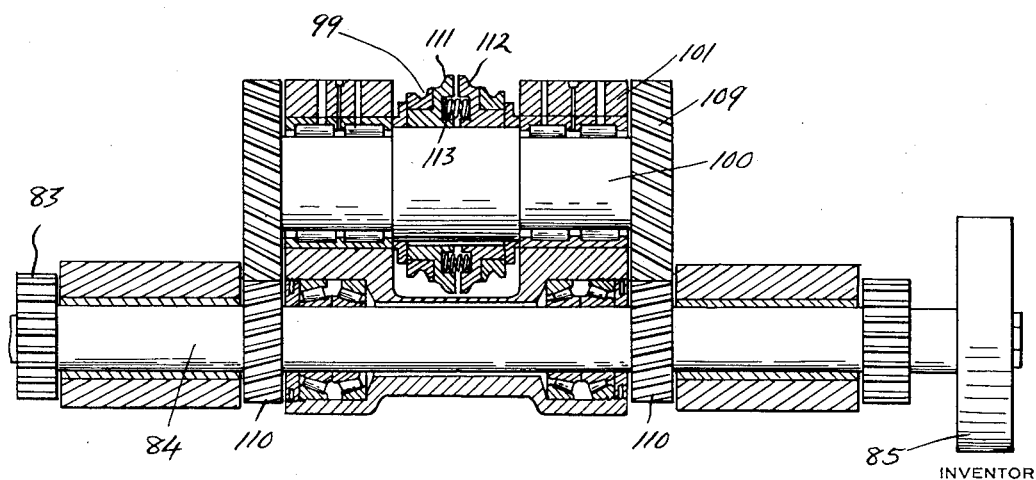
INVENTOR
John Sneed
BY
Whittemore Hulbert Whittemore Belknap
ATTORNEYS Dec. 12, 1933.   J. SNEED   1,939,577
MACHINE FOR FORMING RIM MEMBERS
Filed Aug. 3, 1931   9 Sheets-Sheet 9
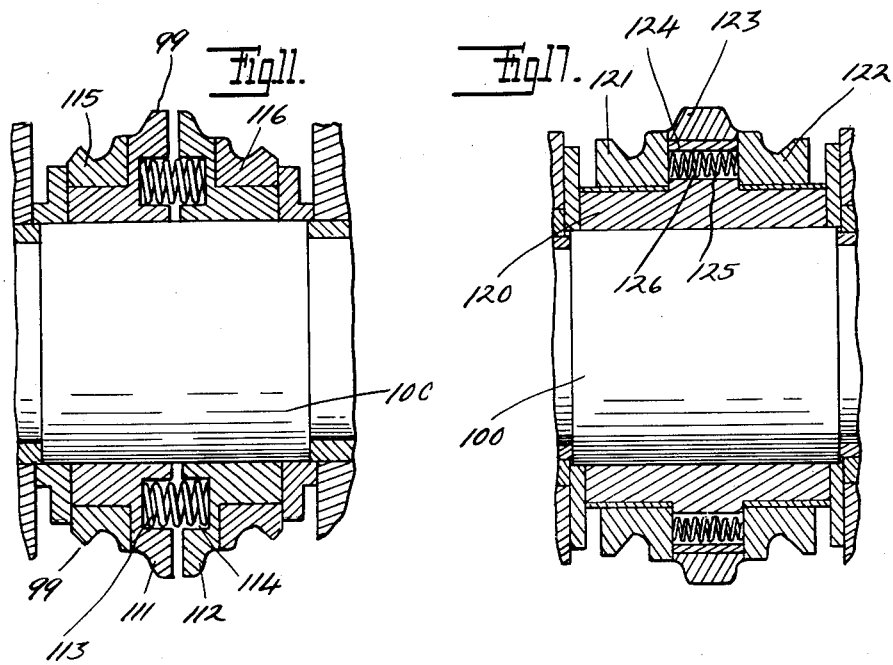
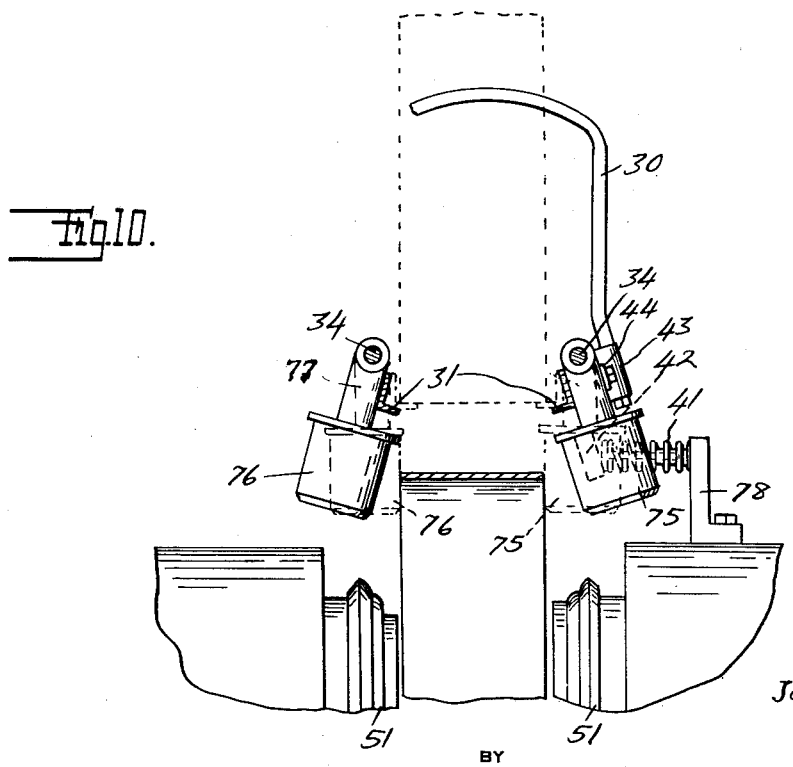
INVENTOR
John Sneed
BY
ATTORNEYS Patented Dec. 12, 1933

1,939,577

UNITED STATES PATENT OFFICE 1,939,577

MACHINE FOR FORMING RIM MEMBERS

John Sneed, Detroit, Mich., assignor to Kelsey-Hayes Wheel Corporation, Detroit, Mich., a corporation of New York Application August 3, 1931. Serial No. 554,308

19 Claims. (Cl. 153—28)

This invention relates generally to metal working machines and refers more particularly to an improved apparatus for fashioning vehicle wheel rims.

While the apparatus hereinafter described may be used advantageously for fashioning rims of various types, nevertheless, it finds particular utility when employed for fashioning drop center vehicle wheel rims, and to this end the invention consists in simplifying and reducing the cost of manufacture of vehicle wheel rims as well as appreciably increasing production thereof.

The invention contemplates securing the foregoing advantageous features with a relatively simple form of apparatus which is thoroughly automatic in operation, requiring the minimum amount of manual attention and so designed as to be capable of accurately rolling rim blanks to predetermined cross-sectional contours.

With the foregoing as well as other objects in view, the invention consists in the relatively simple and novel construction of the apparatus provided herein for expediently fashioning vehicle wheel rims which will be made more apparent as this description proceeds, especially when considered in connection with the accompanying drawings, wherein:

Figure 1 is a side elevational view of a rim forming apparatus constructed in accordance with this invention;

Figure 2 is a top plan view of a portion of the construction illustrated in Figure 1;

Figure 3 is a fragmentary enlarged side elevational view featuring the forming mechanism;

Figure 4 is a sectional view taken substantially on the line 4—4 of Figure 2;

Figure 5 is a sectional view taken substantially on the line 5—5 of Figure 2;

Figure 6 is a fragmentary rear elevational view of the machine illustrated in Figure 1;

Figure 8 is a sectional view taken substantially on the line 8—8 of Figure 2;

Figure 9 is a sectional view taken substantially on the line 9—9 of Figure 3;

Figure 10 is a sectional view taken substantially on the line 10—10 of Figure 2;

Figure 11 is a detail sectional view of one of the forming rolls;

Figure 7:
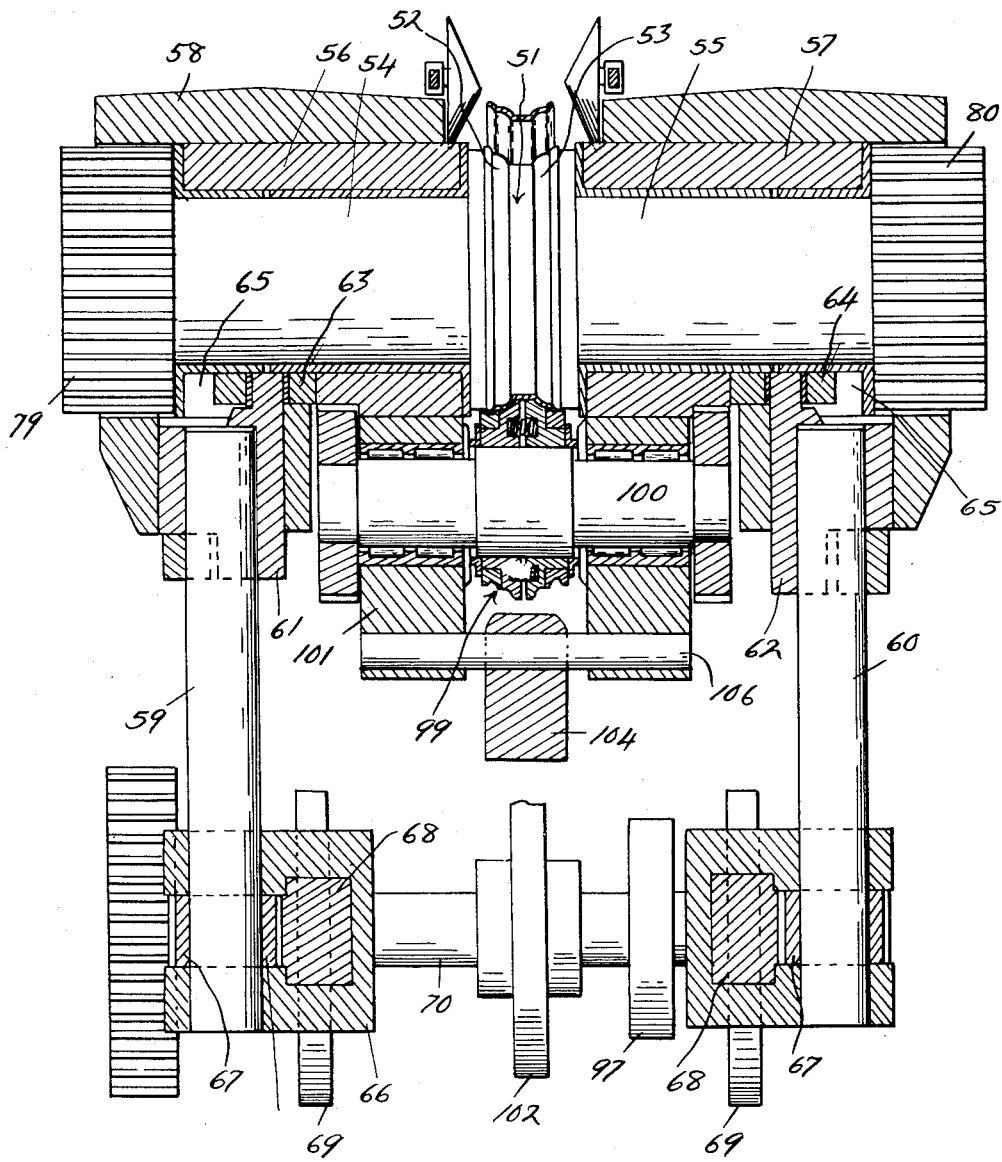
Figure 7 is a sectional plan view of the forming rolls and associated mechanism.

Figures 12 to 16, inclusive, are fragmentary sectional views illustrating the manner in which the forming rolls progressively fashion the blank to a predetermined cross-sectional contour; and Figure 17 is a view similar to Figure 11 showing a slightly modified form of forming roll.

It will be apparent from Figure 1 of the drawings that the rim blanks are advanced along a delivery track to suitable rim forming mechanism comprising generally a master roll formed of a pair of cooperating axially aligned sections movable toward and away from each other at predetermined intervals. As will be more fully hereinafter set forth, the master roll sections cooperate when in their innermost positions to form a continuous surface corresponding to the cross-sectional contour of the drop center rim and when in their outermost positions, to permit the passage therebetween of a rim blank.

The receiving end of the track preferably passes through a suitable bath of cooling fluid so as to cool the blanks during the travel of the same to the forming apparatus and the delivery end of the track is provided with swinging sections located directly above the master forming roll specified above. The arrangement is such that outward swinging movement of the track sections releases the rim blank supported thereby and permits the same to fall by gravity to a position between the roll sections. The track sections are then returned to their normal supporting position and another rim blank positioned thereon. Separation of the track sections to release the rim blank supported thereby is automatically effected in timed relation to the movement of the master roll sections away from each other with the result that as soon as the roll sections are spaced the required distance from each other, the rim blank is delivered to a position so determined that when the roll sections are moved toward each other, they will assume a position within the circumference of the rim blank. As the master roll is moved to a position within the circumference of the rim blank, a second forming roll is moved into engagement with the periphery of the blank to cooperate with the master roll for fashioning the blank to a predetermined cross-sectional contour. Both of the aforesaid rolls are rotatable so as to fashion the rim blank to the desired contour throughout the circumference thereof. In the present instance, the peripheral surfaces of the cooperating rolls are shaped to fashion the blanks into a drop center rim and as will be presently described, corresponding peripheral portions of said rolls are capable of relative rotation so as to compensate for variations in the peripheral speeds of said portions.

Referring now more in detail to the specific construction of the machine shown herein for the purpose of illustration and with special reference to Figure 1 of the drawings, it will be noted that the rim forming mechanism 15 is located at the rear end of the apparatus while the means for cooling the blanks prior to fashioning the same is located at the forward end of the apparatus and is designated herein by the reference character 16. The rim blanks are conducted through the cooling means to the forming mechanism by means of a track 17 having a rearwardly extending elevated portion 18 inclined downwardly so as to permit movement of the rim blanks toward the forming mechanism by the action of gravity. The forward or receiving end of the track 17 is curved downwardly as at 19 and extends through a suitable tank 20 adapted to contain a cooling medium. The track 17 is of sufficient width to adequately support the rim blanks and lateral displacement of the blanks relative to the track during movement of the former along the latter is prevented by means of the side walls of the tank and by suitable rails 21 spaced above the track upon opposite sides thereof. The rails are supported in any suitable manner upon the frame work of the apparatus and as indicated above, serve to guide the rim blanks upon the track from the cooling tank to the forming mechanism.

The rim blanks are conveyed along the portions 19 of the track by means of a feed roll 22 secured upon a suitable shaft 23 which in turn is journaled in suitable bearings 24 secured to the upper edge portions of the tank for limited vertical displacement relative thereto. The feed roll 22 is driven by a pulley 25 secured to the shaft 23 and connected by means of belting and reduction gearing to a prime mover 26 in a manner to be more fully hereinafter described. In order to provide for advancing the blanks by the feed roll 22, the latter is provided with a frictional peripheral surface indicated by the reference character 27 and normally yieldably urged into engagement with the rim blanks by means of suitable springs 28 arranged to normally urge the bearings and accordingly the roll in a direction toward the track. The portion of the track below the feed roll is curved substantially about the normal axis of rotation of the roll and the normal space between the periphery of the roll and track is so determined as to be normally less than the diameter of the rim blanks so that the latter will be frictionally engaged by the peripheral portion of the feed roll and thereby caused to roll along the track through the tank 20.

The foregoing arrangement is such that after the rim blank has been formed by hooping and welding a strip of stock, the resultant annular blank is disposed upon the track between the latter and feed roll 22. The latter then serves to frictionally engage the blank and move the latter into the tank for cooling the same. The blanks are progressively fed into the tank in the manner specified above so that the blanks adjacent the receiving end of the track and engaged by the feed roll will serve to engage the blanks upon the upwardly inclined portion 19 of the track and transfer the latter from the tank to the downwardly inclined portion 18 of the track. The rim blanks are moved rearwardly along the portion 18 of the track under the action of gravity into engagement with a suitable stop 30 which serves to control movement of the rim blanks from the portion 18 of the track to the separable or swinging track sections hereinbefore referred to and designated in the drawings by the character 31. As will be presently described, the above construction is such that as soon as the track sections 31 are separated to discharge the blank thereon, the stop 30 is moved into a position in advance of the next adjacent blank so as to prevent further movement of the latter and as soon as the track sections are returned to their operative supporting positions, the stop 30 is moved out of the path of travel of the rim sections to permit the said adjacent rim blank to move upon the track sections 31 into engagement with a suitable positioning member 32. The positioning member 32 is adjustably secured to a fixed part of the frame as at 33 and serves as a stop for the rim blank supported by the track sections 31.

The track sections 31 are secured to a pair of rockshafts 34 positioned upon opposite sides of the tracks and journaled in suitable bearings carried by the fixed frame of the apparatus. Simultaneous rocking of both of the shafts 34 is insured by providing a pair of intermeshing gear segments 35 and 36 respectively secured to the rockshafts 34 as shown in Figure 6. The rockshafts are normally urged in a direction to separate the track sections 31 for releasing the rim blanks supported thereby by means of suitable coil springs 37 having the opposite ends secured to fingers 38 which in turn are secured to the rockshafts in any suitable manner. The extent of rocking movement of the shafts by the springs 37 is controlled and restricted by means of adjustable stops 39 which may be in the form of set screws adjustably supported by the frame of the apparatus and adapted to engage suitable ears 40 secured to the shafts when the latter are rocked to separate the track sections.

Separation of the track sections 31 by the springs 37 is prevented during the fashioning operation by means of a spring pressed plunger 41 movable with one of the master roll sections in a manner to be presently described and adapted to yieldably engage a fixed stop 42 forming a part of a bracket 43 secured to the outer side of one of the track sections 31 as at 44 and having a portion 45 secured to the rockshaft for the latter track section. The arrangement is such that when the cooperating master roll sections are in operative relation, the spring pressed plunger 41 exerts a force upon the bracket 43 tending to move the track sections toward each other and thereby counteract the tendency of the springs 37 to separate the tracks. The bracket 43 also serves to support the stop 30 in such a manner as to automatically move this stop in advance of the forwardmost rim blank on the track section 18 upon separation of the track sections 31 to release the blank supported thereby and upon movement of the track sections to their operative supporting positions to move the stop out of the path of travel of the rim blanks.

As will be observed from the foregoing description, separation of the cooperating master roll sections effects a corresponding separation of the track sections 31 to permit the rim blanks supported thereby to fall by gravity between the cooperating master roll sections. Downward movement of the rim blank thus released from the tracks is restricted by means of a suitable roll 46 positioned in such a manner as to engage the bottom portion of the rim and also by means of the conical rolls 47 journaled upon the free ends of suitable arms 48 having the opposite ends pivotally connected as at 49 to the machine frame. The rolls 47 are located in advance of the machine frame and are normally yieldably urged into engagement with the forward sides of the rim blank by means of suitable coil springs 50 anchored to the frame and secured to the free ends of the arms 48. The arrangement is such as to urge the blanks rearwardly so as to insure sufficient clearance for movement of the cooperating master roll sections within the circumference of the rim blank. As will be observed from Figure 6, the rolls 47 are spaced from each other a distance less than the width of the rim blank and greater than the width of the finished rim so that after the rim has been fashioned, the same is free to pass out of the apparatus between the rolls 47 as shown in Figure 7.

The master forming roll is designated in Figure 7 by the reference character 51 and as previously stated, comprises a pair of cooperating sections 52 and 53. The sections 52 and 53 are respectively secured to adjacent ends of a pair of aligned shafts 54 and 55. The shafts 54 and 55 are respectively journaled within bearings 56 and 57 which in turn are mounted for reciprocation within axially spaced bearings 58 forming a part of the machine frame. The aforesaid shafts are mounted within the bearings 56 and 57 in such a manner as to reciprocate therewith and accordingly move the master roll sections 52 and 53 toward and away from each other.

For moving the master roll sections toward and away from each other, I provide a pair of rockshafts 59 and 60 having eccentrics 61 and 62 secured to the forward ends thereof and provided with rollers 63 and 64 respectively engageable in suitable slots 65 formed in the bearings 56 and 57. The rear ends of the rockshafts are journaled in suitable standards 66 and have secured thereto pinions 67 adapted to mesh with racks 68 mounted for vertical sliding movement within the standards 66. The racks 68 are actuated to rock the shafts 59 and 60 through the pinions 67 by means of a pair of cams 69 secured to a cam shaft 70 which in turn is journaled in the lower portions of the standards 66. As will be observed from Figure 5, the cams 69 engage suitable rollers 71 journaled within recesses formed in the lower ends of the racks and function upon rotation of the shaft 70 to impart the necessary degree of reciprocation to the racks 68 to secure the desired movement of the master roll sections. The racks are normally maintained into engagement with the cam surfaces 69 by means of suitable coil springs 72 having the lower ends engaging the upper ends of the racks and having the upper ends thereof engaged by a link 73 adjustably mounted upon the rods 74 which also serve to maintain the coil springs in assembled relation with the racks. The cam shaft 70 is rotated by the prime mover 26 through the suitable reduction gearing to be more fully hereinafter described.

The speed of rotation and the development of the cams 69 is so determined that when a rim blank has been completely rolled by the forming rolls, the cams, through the associated mechanism, automatically function to separate the master roll sections 52 and 53 to permit the finished rim to be discharged from the machine and maintain the aforesaid sections in spaced relation until another rim blank has been operatively positioned between the master roll sections. After a rim blank has been positioned between the master roll sections, the latter are simultaneously moved toward each other by the cams 69 to assume a position within the circumference of the rim as previously stated. In this connection, it is to be noted that the rim blank encircling the master roll is maintained in registration therewith throughout the rolling operation by means of suitable guide rolls 75 and 76 arranged on opposite sides of the rim blank and engageable with the adjacent side edges thereof. The roll 76 is journaled upon a suitable bracket 77 secured to one of the track sections 31 so as to move as a unit with the latter while the roll 75 is journaled upon the bracket 43 secured to the other track section 31 in the manner hereinbefore stated. The rolls 75 and 76 are yieldably urged into engagement with the opposite side edges of the rim blank during the rolling operation of the latter by engagement of the spring pressed plunger 41 with the fixed stop 42 upon the bracket 43. The spring pressed plunger 41 is carried by a bracket 78 which in turn is suitably secured to the reciprocable bearing 56 so as to move as a unit therewith. Thus, from the above it will be seen that movement of the master roll sections toward each other effects a corresponding inward movement of the spring pressed plunger 41 and that the latter, in addition to returning the tracks to their operative positions as hereinbefore described, also functions to move the guide rolls 75 and 76 into engagement with opposite side edges of the rim blank.

The master roll sections 52 and 53, in addition to being reciprocably mounted, are also rotatable as a unit so as to provide for fashioning the rim blank throughout the entire circumference thereof. For rotating the sections 52 and 53 at the same peripheral speeds, a pair of gears 79 and 80 are secured respectively to the outer ends of the shafts 54 and 55. The gears 79 and 80 are adapted to mesh with reduction gears 81 mounted upon a countershaft 82 journaled in the frame of the apparatus and the relative widths of the gears is so determined as to permit the required sliding movement of the gears 79 and 80 while maintaining the same in mesh with the reduction gears 81. The latter gears are in turn adapted to mesh with reduction gears 83 fixed to a drive shaft 84 also journaled in the frame of the machine and having a pulley 85 secured thereto around which the belt 86 from the prime mover 26 is reeved. Thus, it will be seen that the master roll sections 52 and 53 are rotated from the prime mover 26 at a reduced speed through the reduction gearing above specified.

As indicated above, the cam shaft 70 is also rotated from the prime mover 26 to effect the desired axial movement of the master roll sections 52 and 53. As will be observed from Figure 3, the cam shaft 70 is rotated at a reduced speed from the drive shaft 84 and the driving connection therebetween comprises a sprocket 88 fixed to one end of the drive shaft 84 and connected, by means of a chain 89, to a sprocket 90 of greater diameter and fixed to a countershaft 91 journaled in the frame of the machine. A suitable pinion 92 is secured to the countershaft 91 and is adapted to mesh with a relatively larger gear 93 fixed to a stub shaft 94 having a relatively small gear 95 thereon meshing with a larger gear 96 secured to the cam shaft.

In the present instance, power is taken directly from the cam shaft 70 to rotate the feed roll 22 for the rim blanks. As shown in Figure 1, a suitable pulley 97 is fixed to the cam shaft and is connected to the pulley 25 by means of a belt 98.

The above described driving mechanism is so designed as to rotate the cams at the speed required to effect the desired reciprocable movements of the master roll sections previously described, and in addition, to feed the blanks to the forming mechanism in timed relation to the reciprocation of the master roll sections.

As indicated in the previous description, the forming mechanism includes a forming roll so arranged as to cooperate with the master roll to fashion the rim blank to a predetermined cross sectional area. The cooperating forming roll is designated herein by the reference character 99 and is best shown in Figures 7 and 9. The forming roll 99 is keyed to a rotatable shaft 100 intermediate the ends thereof in such a manner as to permit sliding movement of the roll upon the shaft, but prevent rotation of the roll relative to the shaft. The shaft 100 is journaled at opposite ends thereof in a frame 101 which in turn is journaled upon the drive shaft 84 for oscillation about the axis of the latter. The above construction is such that the forming roll assumes a position in registration with the master roll and is capable of oscillation about the axis of the shaft 84 for movement toward and away from the master roll.

For oscillating the master roll in the manner specified above, a cam 102 is secured to the cam shaft 70 and is adapted to engage a roller 103 mounted upon the lower end of a suitable bell crank 104 having the upper end thereof pivotally connected by means of an adjustable link 105 to a fixed part of the frame as at 106. The bell crank is pivotally connected intermediate the ends thereof to the forward end of the oscillatable frame 101 as clearly shown in Figure 4 of the drawings. The roll 103 is normally maintained in engagement with the cam 102 by means of a spring 107 having one end secured to the bell crank adjacent the lower end thereof and having the opposite end fixed in any suitable manner to a part of the frame in rear of the bell crank. The cam 102 being secured to the cam shaft 70 is rotated at the same speed as the cam 69 and is so developed as to oscillate the forming roll in timed relation to the actuation of the master roll sections 52 and 53. In other words, the arrangement is such that as the master roll sections are moved toward each other, the forming roll 99 is moved in a direction toward the master roll so as to cooperate with the latter to engage the inner and outer surfaces of the rim blank.

The forming roll 99 is also rotatable about the axis of the shaft 100 and for accomplishing this result, the latter shaft is provided with a pair of pivotal pinions 109 secured to opposite ends thereof and adapted to mesh with cooperating pinions 110 secured to the drive shaft 84 which, as stated above, is driven directly from the prime mover. The gear chain for rotating the master rolls and the gear chain for rotating the forming roll are such as to effect rotation of the rolls in opposite directions and at substantially the same speed so as to provide for efficiently rolling the rim blank without effecting undue slipping of the rolls over the blank.

Owing to the irregular cross-sectional contour of the rim fashioned by the forming rolls, it will be apparent that the peripheral speed of the outer portions of the rim will vary relative to the inner portions of the rim. It necessarily follows, therefore, that since the master roll 51 engages the inner surfaces of the rim and the forming roll 99 engages the outer surfaces of the rim, corresponding portions of the rolls will have different peripheral speeds which is objectionable since it effects a relative sliding movement of the rolls over the work and as a consequence, unduly wears the surfaces of the rolls. In order to minimize wear of the rolls due to variations in the peripheral speeds of different portions thereof, the forming roll 99 is formed of a plurality of relatively rotatable sections. As shown particularly in Figure 11, the roll 99 is formed of two major sections 111 and 112 rotatable as a unit and normally urged in spaced relation to each other by means of a coil spring 113 arranged in cooperating recesses 114 formed in adjacent inner surfaces of the sections 111 and 112. Mounted upon the sections 111 and 112 for rotation relative thereto are suitable rings 115 and 116 movable axially as a unit with the sections 111 and 112 and having the peripheral surfaces thereof forming a continuation of the peripheral surfaces of the latter sections. In other words, the portions of the forming roll 99 for fashioning the outer portions of the rim blank are freely rotatably mounted so that upon engagement of these sections with the rim, they will assume substantially the same peripheral speeds as the corresponding portions of the rim and master roll. By reason of the fact that, virtually, the forming roll is fashioned of two component separable parts movable relative to each other on the shaft 100, the same is in effect automatically adjustable in length so as to insure accurately bending of the rim blank to the contour of the master roll irrespective of wear or slight differences in the corresponding dimensions of the rolls. The foregoing will be evidenced by referring to Figure 15 wherein it is clearly shown that the springs 113 in the forming roll tend to urge the several sections of the latter in opposite directions into engagement with the corresponding portions of the master roll.

While the forming roll 99 is so designed as to compensate for variations in the peripheral speed of the different portions thereof spaced at varying distances from the axis of rotation of the same, it is to be noted that the central or outermost portions of the roll are positively driven with the result that the same will have a different peripheral speed from the corresponding depression in the master roll. In order to eliminate slippage between the rolls resulting from such an arrangement, the portions of the master roll corresponding to the centrally arranged portions of the forming roll 99 are in the nature of a ring 51' freely rotatably mounted upon the master roll 51. In detail, the ring 51' is rotatably mounted upon the section 52 of the master roll and is adapted to overlap the section 53 when the latter is in engagement with the section 52 so as to form in effect a continuation of the peripheral surfaces of said sections. Thus, from the foregoing it will be apparent that since the freely rotatable rings 115 and 116 on the forming roll 99 are adapted to register with the corresponding positively driven portions of the master roll, and in view of the fact that the central positive portions of the forming roll register with the ring 51', the tendency for relative slipping of the rolls over the blank will be reduced to the minimum.

The forming roll 99 may be fashioned by a number of different combinations of sections to secure the results hereinbefore stated. For example, in Figure 17, I have shown a modified form of forming roll composed essentially of four sections designated by the reference characters 120, 121, 122 and 123. The section 120 is secured in any suitable manner to the shaft 100 and is provided with a centrally arranged circular radially extending projection 124 upon which the central section 123 of the roll is journaled. The sections 121 and 122 are freely rotatably mounted upon the section 120 on opposite sides of the central section 123 and the peripheral surfaces thereof are so designed as to form in effect a continuation of the peripheral surfaces of the central section 123. In order to provide for efficient engagement of the peripheral surfaces of the sections 121 and 122 with the corresponding portions of the master roll in the manner outlined above, suitable springs 125 are provided. The springs 125 are located within recesses 126 formed in the central radially extending projection 124 and are open at opposite ends so as to permit the ends of the springs 125 to engage the sections 121 and 122 to normally urge the latter outwardly or away from the central section 123.

Method of manufacture

The apparatus illustrated herein is especially designed for fashioning preformed annular blanks into drop center tire carrying rims and accordingly, the method of producing the tire carrying rims consists first, in fashioning a strip of material to form an annular blank. This step of the method is not illustrated herein, but may be accomplished by hooping a strip of material of predetermined length and welding the ends thereof to form a rim blank of the desired diameter. The blank thus formed is then conveyed through a bath of cooling medium 20 to the forming mechanism 15. Upon introduction of the blank to the forming mechanism 15, the forming rolls 51 and 99 are moved in operative relationship to the inner and outer surfaces of the rim blank as previously stated and the forming rolls are actuated to progressively roll the rim blank to the desired contour in the manner clearly illustrated by Figures 12 to 16, inclusive. After the rim blank has been rolled to the contour illustrated in Figure 16, the rolls are actuated to release the rim and the latter is discharged from the apparatus.

Operation

Referring now more in detail to the operation of the apparatus and with special reference to Figure 1, it will be noted that the prefashioned rim blanks are conveyed through the cooling tank 20 to a position upon the swinging track sections 31 by a single feed roll 22. The rim blanks are positioned upon the swinging tracks 31 by means of a stop 32 and when the blanks are so positioned, they serve to engage the next adjacent blank to prevent movement of the latter upon the track section 31.

Assuming that a rim blank is resting upon the track sections 31 as shown in Figure 1 and also that the cooperating forming rolls are in the position illustrated in Figure 16 wherein they have just completed fashioning the rim blank to the predetermined cross-sectional contour, it will be noted that the cooperating sections 52 and 53 of the master roll are then separated and the forming roll 99 is swung about the axis of the shaft 84 away from the master roll. The arrangement is such that when the master roll sections 52 and 53 have been separated axially to their full extent, the space therebetween is greater than the width of the fashioned rim, thereby permitting movement of the latter past the master roll sections and out of the apparatus between the retaining rollers 47 which, as previously stated, are spaced a sufficient distance apart to permit the passage of the fashioned rim therebetween. During separation of the master roll sections 52 and 53, the spring pressed plunger 41 is moved away from the stop 42 so as to release the track sections 31 and permit the springs 37 to swing the track sections about their pivotal connections and thereby release the rim blank supported thereon. It is to be noted, however, that the length of the spring pressed plunger 41 is such as to counteract the action of the springs 37 until the master roll sections have been moved sufficiently to permit removal of the finished rim sections so that the latter will not interfere with the rim blank released by the track sections 31. Outward swinging of the track sections to release the work supported thereby also causes a corresponding separation of the guide rolls 75 and 76 since the latter are carried by the same brackets to which the track sections are secured. The master roll sections remain separated until the finished rim has been ejected from the machine and until a rim blank is properly positioned between the sections by the rolls 47 and are then automatically moved toward each other until they assume a position within the periphery of the rim blank. As the master roll sections 52 and 53 are moved toward each other, the forming roll 99 is oscillated about the shaft 84 into engagement with the outer surface of the rim. Oscillation of the forming roll 99 and axial movement of the master roll sections is effected in accurate timed relation to each other so that when the master roll sections 52 and 53 approach their relative positions illustrated in Figure 12, the forming roll 99 engages the outer surface of the rim blank in the manner also indicated in the above figure. Continued movement of the forming roll 99 toward the master roll is effected at the same time the sections 52 and 53 are moved together as evidenced by Figures 13 to 16, inclusive, with the result that the rim blank is progressively fashioned to the predetermined desired contour.

What I claim as my invention is:

1. In a machine for fashioning vehicle wheel rims, the combination with a frame, of rim forming mechanism supported by the frame, means for supporting a rim blank above the forming mechanism including track sections pivotally supported by the frame, means for conveying rim blanks to the track section, means operable in timed relation to the operation of the rim forming mechanism for swinging said track sections about their pivots to release the rim blank supported thereon and permit the same to fall by gravity to a position in operative relation to the forming mechanism, and means operable in timed relation to the aforesaid pivotal movement of the track sections for preventing movement of adjacent rim blanks upon said supporting means.

2. In a machine for fashioning vehicle wheel rims, the combination with a frame, of forming mechanism supported by the frame, separable track sections mounted upon the frame above the forming mechanism and operable to support a rim blank, means operable in timed relation for separating said track sections and thereby permitting the rim blank supported thereon to drop by gravity to a position in operative relation to the forming mechanism.

3. In a machine for fashioning vehicle wheel rims, a forming roll adapted to assume a position within the circumference of the rim blank and comprising a pair of axially aligned sections movable toward and away from each other, said sections operable in their innermost positions to cooperate to form a continuous surface corresponding to the contour of the finished rim and operable in their outermost positions to provide for the passage of a rim blank therebetween, means for moving said sections toward and away from each other at predetermined intervals, separable track sections for supporting a rim blank prior to depositing the same between the forming roll sections, means operable upon separation of the forming roll sections to effect a separation of said tracks and thereby release the rim blanks supported thereby to permit the same to assume a position between the forming roll sections, and means for accurately positioning the rim blank between said roll sections to provide for movement of the latter within the circumference of the rim blank.

4. In a machine for fashioning vehicle wheel rims, the combination with a frame, a rim rolling mechanism supported by the frame, separable track sections for supporting a rim blank in operative relation to the forming mechanism prior to the introduction of said blank to the mechanism, means operable in timed relation to the operation of said forming mechanism for separating said track sections to release the rim blank supported thereby, and means carried by said track sections and movable therewith as a unit for guiding the rim blanks during the rolling operation.

5. In a machine for forming vehicle wheel rims, a rotatable shaft, a forming roll comprising sections splined upon said shaft for limited sliding movement relative to each other axially of the shaft, yieldable means normally tending to separate said sections, and rings mounted upon said sections for rotation relative thereto and having peripheral surfaces cooperating with the peripheral portions of said sections to form a continuous face of predetermined cross-sectional contour.

6. In a machine for forming vehicle wheel rims, a rotatable shaft, a forming roll comprising sections splined upon said shaft for limited sliding movement relative to each other axially of the shaft and having projections adjacent the inner ends thereof forming portions of the peripheral surface of the roll, and a ring sleeved upon the outer end portions of each of said sections for rotation relative thereto and cooperating with the projections aforesaid to form the remaining portions of the peripheral surface of the forming roll, and means normally urging said sections and rings in directions away from each other.

7. In a machine for forming vehicle wheel rims, a rotatable shaft, a forming roll comprising sections splined upon said shaft for limited sliding movement relative to each other axially of the shaft and having projections forming portions of the peripheral surface of the roll, a ring mounted on each side of said projections for rotation relative thereto and cooperating therewith to form the remaining portions of the peripheral surface of the forming roll.

8. In a machine for forming vehicle wheel rims, a pair of rolls mounted for cooperation with each other to fashion a rim blank to a predetermined cross-sectional contour, one of said rolls having positively driven peripheral portions and having other peripheral portions rotatable relative to the driven portions, the other of said rolls having positively driven peripheral portions corresponding to the relatively rotatable peripheral portions of said first-named roll and having other relatively rotatable portions corresponding to the positively driven portions of said first-mentioned roll.

9. In a machine for fashioning rim members, forming mechanism comprising cooperating roll sections having portions fashioned to assume a position within the circumference of a rim blank and mounted for axial movement in opposite directions to provide for the passage of a rim blank therebetween, a releasable member for supporting a rim blank in predetermined relation to the sectional rolls prior to the introduction of said blank to the forming mechanism, and means for automatically releasing the blank on the supporting member upon separation of the roll sections.

10. In a machine for fashioning rim members, forming mechanism comprising cooperating axially aligned roll sections having portions fashioned to assume a position within the circumference of a rim blank and mounted for axial movement in opposite directions to provide for the insertion of a blank therebetween, a releasable member for supporting a rim blank in predetermined relation to the forming mechanism, means for automatically releasing the blank upon movement of the forming roll sections away from each other, and means for positioning the rim blank released by said support in operative relation to the forming roll sections.

11. In a machine for fashioning rim members, the combination with a frame, of rim rolling mechanism supported by the frame, a releasable member for supporting a rim blank in predetermined relation to the forming mechanism prior to the introduction of said blank to the latter mechanism, means engageable with a rim blank during the rolling operation for guiding the same, and means operable in timed relation to the operation of said forming mechanism for actuating said member to release the rim blank supported thereby and for moving said guiding means to an inoperative position relative to the forming mechanism.

12. In a machine for fashioning rim members, rim forming mechanism comprising rolls engageable with a rim blank and means for positioning a rim blank with respect to the rolls including members positioned for engagement with a rim blank and spaced from each other a distance greater than the width of a rim member subsequent to the rolling operation so as to permit the latter to be ejected from the mechanism.

13. In a machine for fashioning vehicle wheel rims, rim rolling mechanism, laterally spaced pivotally mounted members for supporting a rim blank in predetermined relation to the forming mechanism prior to the introduction of said blank to the latter mechanism, a guiding element carried by each of the aforesaid supporting members in a position to engage opposite sides of the rim members during the rolling operation, means operable in timed relation to the actuation of the forming mechanism for moving said pivotal members in directions to release the rim blank supported thereby and to move the guiding elements out of engagement with a rim member associated with the forming mechanism, and yieldable means operable to resist the aforesaid pivotal movement of the supporting members and in addition to normally maintain the guiding means into frictional engagement with the sides of the rim members during the rolling operation.

14. In a rolling machine, a rotatable shaft, a forming roll comprising a section mounted upon said shaft for rotation therewith and having a surface forming a portion of the periphery of the roll and a ring mounted upon the section aforesaid for both rotation and axial sliding movement relative thereto and cooperating with the portion aforesaid thereof to form a continuous working surface for the roll.

15. In a rolling machine, a rotatable shaft, a forming roll comprising a section mounted upon said shaft for rotation therewith and having a surface forming a portion of the periphery of the roll, a ring mounted upon the section aforesaid for rotation relative thereto and cooperating with the portion aforesaid thereof to form a continuous working surface for the roll, and means tending to urge the ring axially relative to the section aforesaid in a direction to separate the cooperating portions thereof.

16. In a rolling machine, a rotatable shaft, a forming roll having a section secured to the shaft for rotation as a unit therewith and provided intermediate the ends thereof with a radial projection forming a portion of the working surface of the roll, a ring mounted on each side of the projection for both rotation and axial sliding movement relative thereto and cooperating therewith to form additional working surface portions of the roll.

17. In a rolling machine, rolls mounted for cooperation with each other to fashion a blank to a predetermined cross sectional contour, one of said rolls having a positively driven peripheral portion and having a cooperating peripheral portion freely rotatable relative to the aforesaid portion, another of said rolls having a positively driven peripheral portion corresponding to the freely relatively rotatable peripheral portion of the first named roll and having a freely relatively rotatable portion corresponding to the positively driven portion of the first named roll and means normally exerting a force on one of the aforesaid portions of one of said rolls tending to urge the latter portion in a direction axially away from the other cooperating portion of said roll.

18. In a rolling machine, a rotatable shaft, a forming roll comprising a section mounted upon said shaft for rotation therewith and having a surface forming a portion of the periphery of the roll, a second section freely rotatably mounted relative to the section aforesaid and having a peripheral portion cooperating with the peripheral portion of said first named section to form a continuous working surface, and means normally urging said second section in an axial direction away from the first named section.

19. In a rolling machine, a rotatable shaft, a forming roll comprising a section mounted upon the shaft for rotation therewith and having a portion intermediate the ends thereof forming a part of the periphery of the roll, sections freely rotatably mounted upon opposite sides of the portion aforesaid and having surfaces cooperating with said portion to form additional parts of the periphery of the roll, and means normally tending to urge said second sections in opposite directions away from the portion on the first named section of the roll.

JOHN SNEED.